(12) United States Patent
Zhang et al.

(10) Patent No.: US 11,122,530 B2
(45) Date of Patent: Sep. 14, 2021

(54) METHOD AND APPARATUS OF SYNCHRONIZING DEVICE TO DEVICE TERMINALS IN TIME AND FREQUENCY

(71) Applicant: Samsung Electronics Co., Ltd., Gyeonggi-do (KR)

(72) Inventors: Shichang Zhang, Beijing (CN); Yingyang Li, Beijing (CN); Chengjun Sun, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 44 days.

(21) Appl. No.: 15/539,651

(22) PCT Filed: Dec. 23, 2015

(86) PCT No.: PCT/KR2015/014203
§ 371 (c)(1),
(2) Date: Jun. 23, 2017

(87) PCT Pub. No.: WO2016/105136
PCT Pub. Date: Jun. 30, 2016

(65) Prior Publication Data
US 2017/0353936 A1    Dec. 7, 2017

(30) Foreign Application Priority Data

Dec. 25, 2014  (CN) .......................... 201410827794.9
May 21, 2015  (CN) .......................... 201510262562.8

(51) Int. Cl.
*H04W 56/00*   (2009.01)
*H04W 8/00*    (2009.01)
(Continued)

(52) U.S. Cl.
CPC ......... *H04W 56/0015* (2013.01); *H04L 5/005* (2013.01); *H04W 8/005* (2013.01);
(Continued)

(58) Field of Classification Search
CPC ......... H04W 4/70; H04W 8/00; H04W 8/005; H04W 56/00; H04W 56/001;
(Continued)

(56) References Cited

U.S. PATENT DOCUMENTS 9,692,533 B2 *   6/2017  Samuelsson ............ H04W 4/90
2012/0093098 A1*  4/2012  Charbit ............... H04W 52/343
                                                        370/329
(Continued)

FOREIGN PATENT DOCUMENTS

CN    103369585 A    10/2013
CN    104202712 A    12/2014
(Continued)

OTHER PUBLICATIONS

Extended European Search Report, regarding Application No. 15873663.7, dated Mar. 22, 2018, 19 pages.
(Continued)

*Primary Examiner* — Jeffrey M Rutkowski
*Assistant Examiner* — Luna Weissberger

(57) ABSTRACT

The present disclosure relates to a sensor network, machine type communication (MTC), machine-to-machine (M2M) communication, and technology for interne of things (IoT). The present disclosure may be applied to intelligent services based on the above technologies, such as smart home, smart building, smart city, smart car, connected car, health care, digital education, smart retail, security and safety services. The present disclosure provides a method of synchronizing device to device (D2D) terminals. Under partial coverage (PC) scenarios, an in coverage user equipment (ICUE) may send a D2D synchronization signal (D2DSS) and a physical sidelink broadcast channel (PSBCH) on synchronization resources of a cell to implement mutual discovery of an
(Continued)

ICUE and an out of coverage user equipment (OCUE) when a condition for triggering the D2DSS is satisfied.

12 Claims, 2 Drawing Sheets

(51) Int. Cl.
*H04L 5/00* (2006.01)
*H04W 72/00* (2009.01)

(52) U.S. Cl.
CPC ....... *H04W 56/001* (2013.01); *H04W 56/002* (2013.01); *H04W 72/005* (2013.01)

(58) Field of Classification Search
CPC ........... H04W 56/0015; H04W 56/002; H04W 72/00; H04W 72/005; H04W 76/14; H04W 88/02; H04W 88/04; H04W 92/18; H04L 5/0048; H04L 5/005
USPC .......................................................... 370/336
See application file for complete search history.

(56) References Cited

U.S. PATENT DOCUMENTS

| | | | |
|---|---|---|---|
| 2014/0099950 A1 | 4/2014 | Mildh et al. | |
| 2014/0295827 A1* | 10/2014 | Tesanovic | H04W 76/14 455/426.1 |
| 2014/0323126 A1 | 10/2014 | Ro et al. | |
| 2014/0335853 A1 | 11/2014 | Sartori et al. | |
| 2015/0009949 A1* | 1/2015 | Khoryaev | H04W 72/044 370/330 |
| 2015/0208453 A1* | 7/2015 | Yamazaki | H04W 76/14 370/329 |
| 2015/0264552 A1* | 9/2015 | Xiong | H04W 8/005 370/329 |
| 2015/0271856 A1* | 9/2015 | Tong | H04W 16/26 455/426.1 |
| 2015/0326362 A1* | 11/2015 | Xiong | H04W 8/005 370/336 |
| 2015/0327201 A1* | 11/2015 | He | H04W 48/16 370/336 |
| 2016/0007269 A1* | 1/2016 | Chae | H04L 5/0048 370/330 |
| 2016/0007383 A1* | 1/2016 | Chae | H04W 76/14 455/404.1 |
| 2016/0142991 A1* | 5/2016 | Classon | H04W 56/001 370/350 |
| 2016/0183121 A1* | 6/2016 | Kazmi | H04W 28/18 370/230 |
| 2016/0204885 A1* | 7/2016 | Sorrentino | H04W 72/04 455/67.11 |
| 2016/0227495 A1* | 8/2016 | Lee | H04W 56/00 |
| 2016/0270012 A1* | 9/2016 | Chen | H04W 56/002 |
| 2016/0295533 A1* | 10/2016 | Sorrentino | H04W 4/80 |
| 2016/0302152 A1* | 10/2016 | Morita | H04W 52/0212 |
| 2016/0337839 A1* | 11/2016 | Chae | H04W 76/14 |
| 2016/0374068 A1* | 12/2016 | Kim | H04W 72/04 |
| 2017/0013628 A1* | 1/2017 | Kim | H04J 11/0026 |
| 2017/0034688 A1* | 2/2017 | Kim | H04W 76/14 |
| 2017/0041892 A1 | 2/2017 | Xia et al. | |
| 2017/0086158 A1* | 3/2017 | Feng | H04W 56/0025 |
| 2017/0127287 A1* | 5/2017 | Fujishiro | H04W 4/70 |
| 2017/0150330 A1* | 5/2017 | Kim | H04W 4/90 |
| 2017/0231023 A1* | 8/2017 | Adachi | H04W 28/06 |
| 2017/0245229 A1* | 8/2017 | Seo | H04W 24/04 |
| 2017/0295554 A1* | 10/2017 | Lee | H04J 11/00 |
| 2017/0303217 A1* | 10/2017 | Lee | H04J 11/00 |
| 2017/0311344 A1* | 10/2017 | Lee | H04W 72/1289 |
| 2017/0339511 A1* | 11/2017 | Lee | H04L 5/0048 |
| 2017/0339546 A1* | 11/2017 | Seo | H04W 24/10 |
| 2017/0339679 A1* | 11/2017 | Lee | H04L 5/0048 |
| 2017/0367087 A1* | 12/2017 | Seo | H04W 72/02 |

FOREIGN PATENT DOCUMENTS

| | | |
|---|---|---|
| WO | 2014113088 A1 | 7/2014 |
| WO | 2014178658 A1 | 11/2014 |

OTHER PUBLICATIONS

Qualcomm Inc., "D2DSS Signal Design", R1-145229, 3GPP TSG-RAN WG1 #79, San Francisco, Nov. 17-21, 2014, 13 pages.
Huawei et al., "D2D Synchronization Procedure", R1-145092, 3GPP TSG RAN WG1 Meeting #79, San Francisco, Nov. 17-21, 2014, 6 pages.
Ericsson, "WF on Synchronization Behavior (Transmitter)", R1-145288, 3GPP TSG RAN WG1 #79, San Francisco, Nov. 17-21, 2014, 8 pages.
Partial Supplementary European Search Report, regarding Application No. 15873663.7, dated Dec. 14, 2017, 17 pages.
The State Intellectual Property Office of the People's Republic of China, "The First Office Action," Application No. CN 201510262562.8, dated Jul. 24, 2019, 23 pages.
Patil, Shailesh, "LTE Device to Device Proximity Services", Status Report to TSG, 3GPP TSG RAN meeting #66, Dec. 8-11, 2014, RP-141894, 38 pages.
Office Action dated May 6, 2020 in connection with Chinese Patent Application No. 201510262562.8, 34 pages.
InterDigital Communications, "On remaining details of D2DSS design", 3GPP TSG-RAN WG1#79, Nov. 17-21, 2014, R1-145041, 4 pages.

* cited by examiner

[Fig. 1]
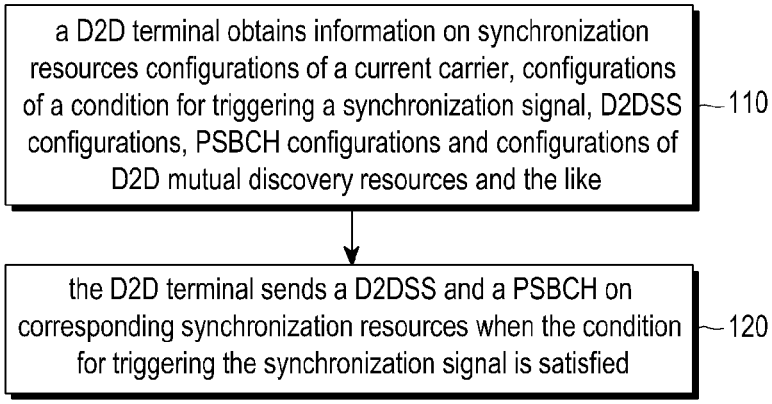
[Fig. 2]
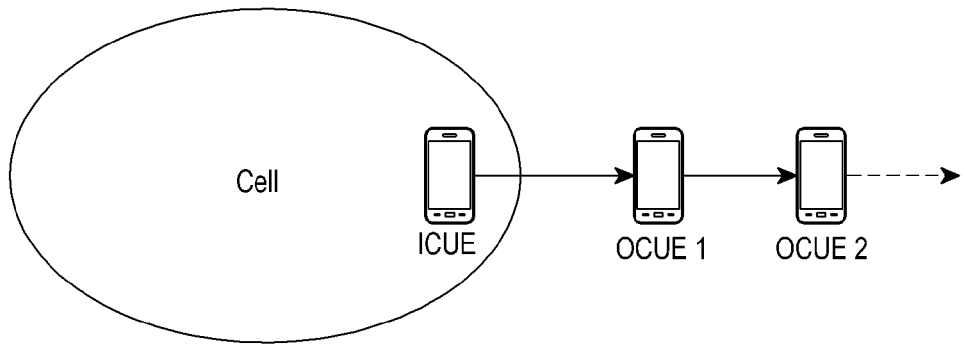
[Fig. 3]
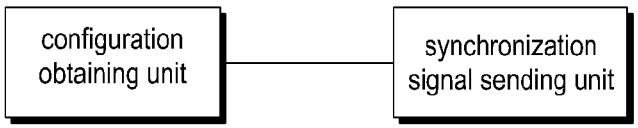
[Fig. 4]
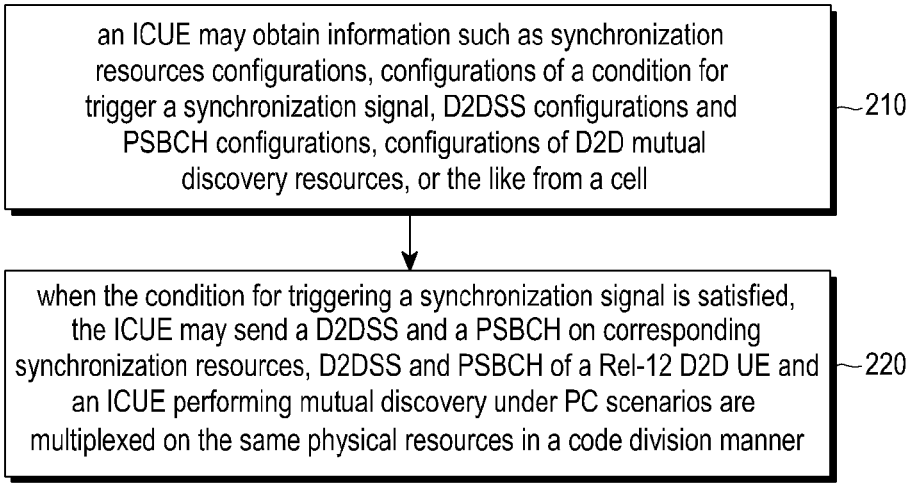

[Fig. 5]
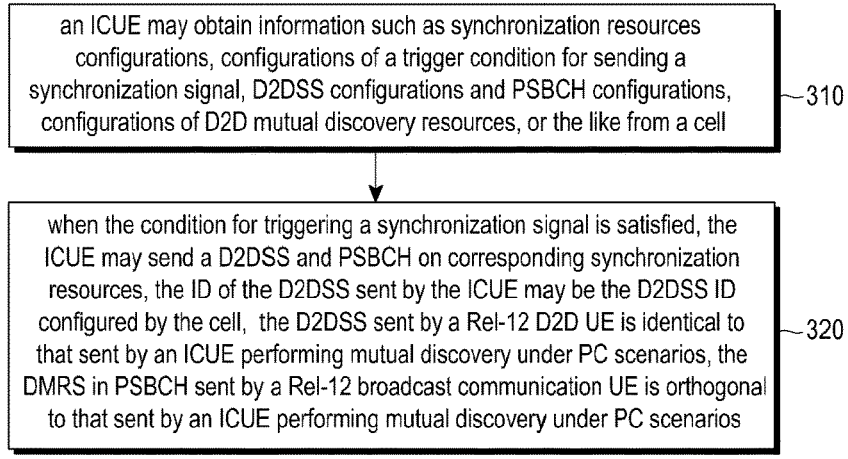
[Fig. 6]
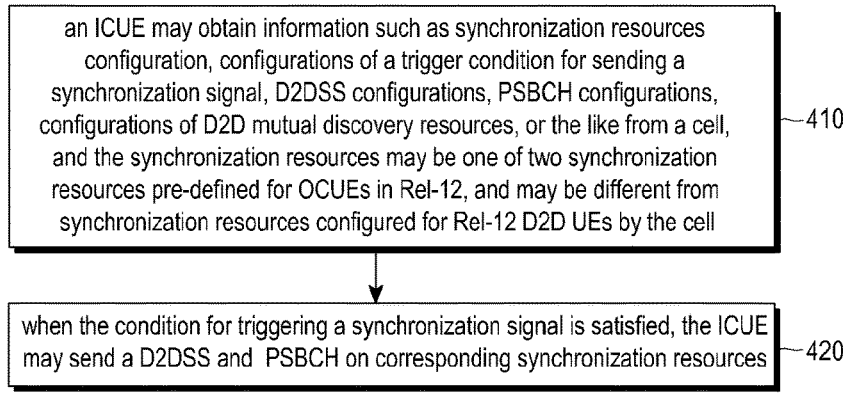
[Fig. 7]
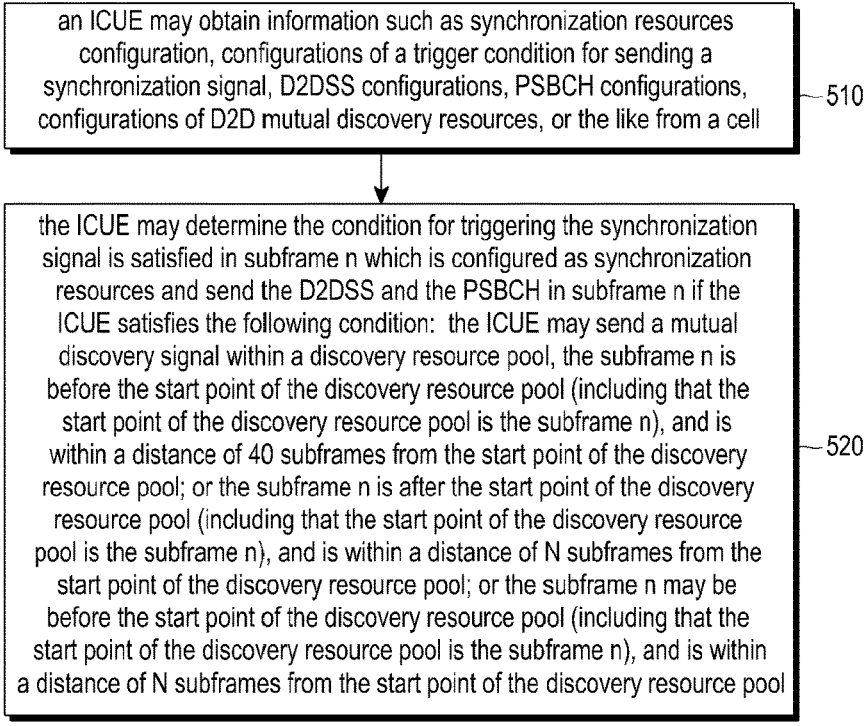

METHOD AND APPARATUS OF SYNCHRONIZING DEVICE TO DEVICE TERMINALS IN TIME AND FREQUENCY

CROSS-REFERENCE TO RELATED APPLICATION(S)

This application is a National Stage application under 35 U.S.C. § 371 of PCT/KR2015/014203 filed on Dec. 23, 2015, which claims priority from a Chinese Patent Application No. 201410827794.9 filed on Dec. 25, 2014 and a Chinese Patent Application No. 201510262562.8 filed on May 21, 2015 in the Chinese Intellectual Property Office, all the disclosures of which are incorporated in their entireties by reference.

TECHNICAL FIELD

The present disclosure relates to mobile communications, and particularly, to a method and an apparatus of synchronizing device to device (D2D) terminals in time and frequency in a D2D communication system.

BACKGROUND ART

The Internet, which is a human centered connectivity network where humans generate and consume information, is now evolving to the internet of things (IoT) where distributed entities, such as things, exchange and process information without human intervention. The internet of everything (IoE), which is a combination of the IoT technology and the big data processing technology through connection with a cloud server, has emerged. As technology elements, such as "sensing technology", "wired/wireless communication and network infrastructure", "service interface technology", and "security technology" have been demanded for IoT implementation, a sensor network, a machine-to-machine (M2M) communication, machine type communication (MTC), and so forth have been recently researched.

Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

D2D techniques have been accepted by the third generation partnership project (3GPP) for the great potential of D2D in fields such as public safety and civil communications. 3GPP has standardized some functions of D2D, including in coverage (IC) mutual discovery of D2D terminals, broadcast communications between D2D terminals under IC scenarios, partial coverage (PC) scenarios and out of coverage (OC) scenarios.

According to current conclusions of 3GPP, for UEs performing D2D mutual discovery, a UE that has sent a D2D discovery signal may send a D2D synchronization signal (D2DSS) on synchronization resources configured by the cell after receiving an indication from an eNB or when the UE is at a cell edge, such that D2D terminals may be synchronized at the subframe level. The D2DSS may include a primary D2DSS (PD2DSS) and a secondary D2DSS (SD2DSS). The PD2DSS uses a Zadoff-Chu (ZC) sequence with a length of 62 and root indices of 26 and 37. The SD2DSS uses an m sequence with a length of 62. For UEs performing D2D broadcast communications, an in coverage UE (ICUE) that sent a broadcast signal may send a D2DSS on synchronization resources configured by the cell after receiving an indication from an eNB or when the ICUE is at a cell edge, such that UEs sending broadcast signals and UEs receiving broadcast signals are synchronized at subframe level. In addition, the ICUE that sent the broadcast signal may send a D2D broadcast channel (PSBCH) to send the above information to an out of coverage UE (OCUE) so that the OCUE can obtain information on system frames, system bandwidth, TDD configurations and etc. of the cell.

The D2D synchronization resources has a period of 40 ms, with the carrier frequency of the cell as the center, occupies 6 physical resource blocks (PRB), and has a length of one subframe. In a synchronization period, an OCUE may pre-configure two synchronization resources corresponding to two different offsets respectively. According to current standards, if synchronization resources are configured in a cell, the offset of the synchronization resources configured in the cell may be the smaller offset of the two offsets of synchronization resources pre-configured by the OCUE. The D2DSS may occupy 4 of single-carrier frequency-division multiple access (SC-FDMA) symbols in the subframe. The rest of SC-FDMA symbols excluding the last SC-FDMA symbol, which is used as guard period (GP), may be used for PSBCH transmission. D2DSS from D2D mutual discovery UEs (herein simply referred to as discovery UEs) and D2D broadcast communication UEs (herein simply referred to as communication UEs) may share the D2DSS synchronization resources. That is, D2DSSs from the two types of UEs may be piled up on the same time-frequency resources if a discovery UE and a communication UE both satisfy a condition for sending D2DSS on some D2DSS synchronization resources.

An OCUE performing D2D broadcast communication may select a synchronization source according to signal strength of D2D synchronization signals from D2D synchronization sources. Since there may be D2DSS of a discovery UE on the D2DSS resources, the OCUE may measure the signal strength of the synchronization signal using a demodulation reference signal (DMRS) of the PSBCH.

DISCLOSURE OF INVENTION

Technical Problem

Currently fulfilled D2D functions in 3GPP Rel-12, however, are far from enough to satisfy the needs of users. It has been a broad consensus producers of various communication terminals and network devices to further enhance the D2D function framework in subsequent 3GPP releases. D2D mutual discovery under PC scenarios and OC scenarios is one of the functions that are the top priority to be implemented. Compared with the already implemented D2D mutual discovery under IC scenarios, enhancement of D2D mutual discovery under PC scenarios and OC scenarios require synchronization between ICUEs and OCUEs and synchronization between OCUEs at the system frame level. At the same time, implementation of the synchronization should avoid affecting legacy D2D terminals.

At present, there is no satisfactory solution to the synchronization of terminals during D2D mutual discovery under PC scenarios and OC scenarios with backward compatibility.

Solution to Problem

An embodiment of the present invention describes a method of synchronizing device to device (D2D) of D2D terminals in time and frequency. The method comprise obtaining, by a D2D terminal, information on synchronization resources configurations of a current carrier, configurations of a condition for triggering a synchronization signal, D2D synchronization signal (D2DSS) configurations, physical sidelink broadcast channel (PSBCH) configurations, configurations of D2D mutual discovery resources; and sending, by the D2D terminal, a D2DSS and a PSBCH on synchronization resources determined by the synchronization resources configurations and the configurations of D2D mutual discovery resources according to the D2DSS configurations and the PSBCH configurations in response to a determination that the condition for triggering the synchronization signal is satisfied.

Another embodiment of the present invention describes an apparatus of synchronizing device to device (D2D) terminals. The apparatus comprises a configuration obtaining unit and a synchronization signal sending unit, wherein the configuration obtaining unit is configured to obtain synchronization resources configurations of a current carrier, configurations of a condition for triggering a synchronization signal, D2D synchronization signal (D2DSS) configurations, physical sidelink broadcast channel (PSBCH) configurations, and configurations of D2D mutual discovery resources; and the synchronization signal sending unit is configured to send a D2DSS and a PSBCH on synchronization resourced determined by the synchronization resources configurations and the configurations of D2D mutual discovery resources according to the D2DSS configurations and the PSBCH configurations in response to a determination that the condition for triggering the synchronization signal.

BRIEF DESCRIPTION OF DRAWINGS

FIG. 1 is a flowchart illustrating a method of synchronizing D2D terminals in time and frequency in accordance with an example of the present disclosure;

FIG. 2 is a schematic diagram illustrating forwarding of D2DSS and PSBCH in accordance with an example of the present disclosure; and FIG. 3 is a schematic diagram illustrating a basic structure of a device of synchronizing D2D terminals in time and frequency in accordance with an example of the present disclosure;

FIG. 4 is a flowchart illustrating a method of synchronizing D2D terminals in time and frequency in accordance with an example of the present disclosure;

FIG. 5 is a flowchart illustrating a method of synchronizing D2D terminals in time and frequency in accordance with an example of the present disclosure;

FIG. 6 is a flowchart illustrating a method of synchronizing D2D terminals in time and frequency in accordance with an example of the present disclosure; and FIG. 7 is a flowchart illustrating a method of synchronizing D2D terminals in time and frequency in accordance with an example of the present disclosure.

MODE FOR THE INVENTION

In order to make the objectives, technical schemes and merits of the present invention clearer, a detailed description of the present invention is hereinafter given with reference to specific embodiments.

A Rel-13 ICUE supporting D2D mutual discovery may perform only category one mutual discovery, or only category two mutual discovery, or both category one mutual discovery and category two mutual discovery within a specified time period (no shorter than one minimum discovery period, i.e., 320 ms).

A Rel-13 UE which is in an RRC connected state and supports D2D mutual discovery may send a D2DSS and a PSBCH after receiving an instruction of sending synchronization signal from an eNB.

A Rel-13 UE performing only category one mutual discovery, i.e., an ICUE sending mutual discovery signals only within a resource pool configured by an eNB for category one mutual discovery, may only send a D2DSS. The Rel-13 UE may send the D2DSS in the same manner as a Rel-12 UE performing D2D mutual discovery.

An ICUE performing category two mutual discovery (including an ICUE performing both category one mutual discovery and category two mutual discovery) may send a D2DSS and a PSBCH as long as the ICUE sends a mutual discovery signal in a resource pool configured by an eNB for category two mutual discovery or performs discovery resource selection within the resource pool (no matter whether discovery resources are successfully selected) or has a cached discovery signal to be transmitted in the resource pool. The ICUE may send the D2DSS and the PSBCH according to the method of various examples.

The category one mutual discovery refers to mutual discovery under IC scenarios defined in Rel-12, or mutual discovery for commercial purposes, or mutual discovery within a resource pool for mutual discovery configured by an eNB via a Rel-12 configuration message. The category two mutual discovery refers to mutual discovery under PC or OC scenarios defined in Rel-13, or mutual discovery for safety purposes, or mutual discovery within a resource pool for mutual discovery configured by an eNB via a Rel-13 configuration message.

Under PC scenarios, ICUEs and OCUEs may be synchronized at the system frame level to perform D2D mutual discovery. Further, an OCUE may obtain information of a cell, such as system bandwidth, TDD configurations, etc., to determine resource configurations for D2D mutual discovery. Therefore, UEs performing D2D mutual discovery under PC scenarios and OC scenarios may send a PSBCH under specific conditions. According to Rel-12, however, D2D terminals may measure signal strength of synchronization signals sent by synchronization sources using demodulation reference signals in PSBCH. In order to avoid affecting Rel-12 D2D terminals, various examples provide a method of sending synchronization signals. The method sends a PSBCH using resources corresponding to the PSBCH while avoiding affecting Rel-12 D2D terminals. As shown in FIG. 1, the method may include the following procedures.

At step 110, a D2D terminal may obtain information such as synchronization resources configurations of a current carrier, configurations of a condition for sending a synchronization signal, D2DSS configurations, PSBCH configurations, configurations of D2D mutual discovery resources, or the like.

The configurations of D2D mutual discovery resources may specify an offset of a resource pool for D2D mutual discovery under PC and/or OC scenarios against the zeroth system frame, a period, and subframe locations occupied by the resource pool in each period. An ICUE may obtain the configurations from received cell signaling. An OCUE may obtain the configurations from pre-set configurations or definitions in standards.

At step 120, when the condition for triggering a synchronization signal is satisfied, the D2D terminal may send a D2DSS and a PSBCH on corresponding synchronization resources.

The D2D terminal may determine synchronization resources according to the synchronization resources configurations and the configurations of D2D mutual discovery resources, and send the D2DSS and PSBCH on the synchronization resources determined.

The above technical mechanism is described with reference to practical application scenarios and interaction modes of determines to facilitate understanding of the mechanism.

Example One

This example is in a PC scenario, i.e., UEs performing D2D mutual discovery includes ICUEs and OCUEs. An ICUE may send a D2DSS and a PSBCH when a D2DSS sending condition is satisfied. Resources occupied by the D2DSS and the PSBCH are identical to that of a D2DSS and a PSBCH sent by a Rel-12 broadcast communication UE. The value range of a D2DSS ID is different from that of a Rel-12 D2D UE. As such, the DMRS in a D2DSS and a PSBCH sent by the UE performing D2D mutual discovery under PC scenarios may be orthogonal to that sent by a Rel-12 D2D UE. FIG. 4 is a flowchart illustrating a method of synchronizing D2D terminals in time and frequency in accordance with an example of the present disclosure. As shown in FIG. 4, the process may be as follows.

At step 210, an ICUE may obtain information such as synchronization resources configurations, configurations of a condition for trigger a synchronization signal, D2DSS configurations and PSBCH configurations, configurations of D2D mutual discovery resources, or the like from a cell.

The synchronization resources configurations may include a subframe location and a period of D2DSS transmission. The configurations of the condition for triggering a synchronization signal may include at least a reference signal receiving power (RSRP) threshold. When the RSRP measured by an ICUE is smaller than the RSRP threshold and a condition configured for the cell or defined in a standard is satisfied, the ICUE may send a D2DSS and PSBCH on the synchronization resources. The D2DSS configurations may include at least information of the ID of the D2DSS. In an example, the ID information may be configured via signaling that is used for configuring the same information in Rel-12. The IDs of D2DSSs sent by Rel-12 UEs and UEs performing mutual discovery under PC scenarios may be obtained from the information directly or indirectly. In another example, the ID information may be configured via newly defined signaling. The ID of a D2DSS sent by a UE performing mutual discovery under PC scenarios may be obtained from the ID information directly. The PSBCH configurations may include at least the value of a reserved bit in the PSBCH. The configurations of D2D mutual discovery resources may specify the offset of the resource pool for D2D mutual discovery under PC scenarios against the zeroth system frame, a period and a subframe location of the resource pool in each period.

At step 220, when the condition for triggering a synchronization signal is satisfied, the ICUE may send a D2DSS and a PSBCH on corresponding synchronization resources.

D2DSS and PSBCH of a Rel-12 D2D UE and an ICUE performing mutual discovery under PC scenarios are multiplexed on the same physical resources in a code division manner.

If the ICUE satisfies the following three conditions, the ICUE may determine the condition for triggering the synchronization signal is satisfied in subframe n which is configured as synchronization resources, and send the D2DSS and the PSBCH in subframe n.

1. The ICUE may send a mutual discovery signal within a discovery resource pool. In an example, the start point of the discovery resource pool is no earlier than subframe n+Δ (including that the start point of the discovery resource pool is the beginning of subframe n+Δ), and is within a distance of 40+Δ subframes from subframe n. The Δ is the distance between two synchronization resources configured for OCUEs. In another example, the start point of the discovery resource pool is no earlier than subframe n (including that the start point of the discovery resource pool is the subframe n), and is within a distance of 40≠M subframes from subframe n. M is an integer larger than 1. The value of M may be configured by the cell or defined in a standard. In yet another example, the start point of the discovery resource pool is no earlier than subframe n (including that the start point of the discovery resource pool is the subframe n), and is within a distance of 40 subframes from subframe n.

2. The RSRP measured by the ICUE is smaller than the RSRP threshold configured by the cell.

3. The ICUE may not transmit a wide area network (WAN) uplink signal in subframe n.

The above first condition is for providing an OCUE which receives the synchronization signal and the PSBCH of the ICUE with an opportunity to forward the synchronization signal and the PSBCH in order to extend the synchronization range. In addition, the above first condition includes two situations, and the first condition may be determined to be satisfied as long as either situation is satisfied. The n is the serial number of the subframe which is configured to be synchronization resources.

In an example, D2D synchronization resources configurations corresponding to subframe n may be applicable to Rel-12 broadcast communication UEs, Rel-12 mutual discovery UEs and UEs performing mutual discovery under PC scenarios.

The value range of the ID of the D2DSS sent by the ICUE may have a size smaller than 168, and may be denoted as [x, y]. In an example, 336≤x, and y≤503. If the D2DSS ID information is configured by re-using Rel-12 signaling at step 210, the ID of the D2DSS sent by the ICUE may be obtained by adding an offset to the ID value configured in the signaling. The offset may be configured by the cell or defined in a standard. In an example, the offset may be 336. If the D2DSS ID of a UE performing D2D mutual discovery under PC scenarios is configured via newly defined signaling at step 210, the ID of the D2DSS sent by the ICUE may be the D2DSS ID configured via the signaling.

The PD2DSS sent by the ICUE may have a sequence length of 62. The root index of the sequence may be a value other than 26, 37, 25, 29 and 24. In an example, the PD2DSS may adopt a ZC sequence whose root index is 22 to provide good cross correlation with primary synchronization signals whose root indices are 26, 37, 25, 29 and 34.

The SD2DSS sent by the ICUE may have a sequence length of 62, and may adopt a secondary synchronization signal (SSS) sequence defined in Rel-8 for a cell ID being the D2DSS ID.

The scrambling manner of PSBCH data and the manner of determining the PSBCH demodulation reference signal may re-use the scrambling manner of PUSCH data and the manner of determining the PUSCH demodulation reference signal. Parameters are as shown in Table 1.

Table 1 Parameters for scrambling PSBCH data and parameters of PSBCH demodulation reference signal

TABLE 1

| | data scrambling | | | | DMRS parameter | | | | |
|---|---|---|---|---|---|---|---|---|---|
| | cell ID | RNTI | timeslot index | code-word index | group hopping | sequence hopping | offset $\Delta_{ss}$ | cell ID | cyclic shift CS | OCC |
| PSBCH | D2DSS ID[x,y] | 0 | 0 | 0 | Off | Off | 0 | D2DSS ID bits 4-9 | D2DSS ID bits 1-3 | D2DSS ID bit 0 |

Hence, the process of this example is completed. According to the method of this example, D2DSS and PSBCH of a Rel-12 D2D UE and an ICUE performing mutual discovery under PC scenarios are multiplexed on the same physical resources in a code division manner. This can avoid affecting a measurement performed by the Rel-12 D2D UE, and can reduce the ratio of cellular network uplink resources occupied by D2D. In addition, the mechanism has relatively smaller influence on existing standards.

Example Two

This example is under a PC scenario, i.e., UEs performing D2D mutual discovery may include ICUEs and OCUEs. An ICUE may send a D2DSS and PSBCH when a D2DSS transmission condition is satisfied. The resources occupied by the D2DSS and the PSBCH may be identical to the resources occupied by D2DSS and PSBCH sent by a Rel-12 broadcast communication UE. The ICUE may adopt the same D2DSS sequence as a Rel-12 D2D terminal. The sequence of the demodulation reference signal in the PSBCH may be orthogonal to the sequence of a demodulation reference signal in a PSBCH sent by a Rel-12 broadcast communication UE. FIG. 5 is a flowchart illustrating a method of synchronizing D2D terminals in time and frequency in accordance with an example of the present disclosure. As shown in FIG. 5, the process may be as follows.

At step 310, an ICUE may obtain information such as synchronization resources configurations, configurations of a trigger condition for sending a synchronization signal, D2DSS configurations and PSBCH configurations, configurations of D2D mutual discovery resources, or the like from a cell.

The synchronization resources configurations may include a subframe location and a period of D2DSS transmission. The configurations of the trigger condition for sending a synchronization signal may include at least an RSRP threshold. When the RSRP measured by an ICUE is smaller than the RSRP threshold and a condition configured for the cell or defined in a standard is satisfied, the ICUE may send a D2DSS and PSBCH on the synchronization resources. The D2DSS configurations may include at least the information of a D2DSS ID. In an example, the IDs of D2DSSs sent by a Rel-12 UE and a UE performing mutual discovery under PC scenarios may be obtained from the D2DSS configurations. The PSBCH configurations may include at least the value of reserved bits in the PSBCH. The configurations of D2D mutual discovery resources may specify the offset of the resource pool for D2D mutual discovery under PC scenarios against the zeroth system frame, a period and a subframe location of the resource pool in each period.

At step 320, when the condition for triggering a synchronization signal is satisfied, the ICUE may send a D2DSS and PSBCH on corresponding synchronization resources.

The ID of the D2DSS sent by the ICUE may be the D2DSS ID configured by the cell. The D2DSS sent by a Rel-12 D2D UE is identical to that sent by an ICUE performing mutual discovery under PC scenarios, the DMRS in PSBCH sent by a Rel-12 broadcast communication UE is orthogonal to that sent by an ICUE performing mutual discovery under PC scenarios.

If the ICUE satisfies the following three conditions, the ICUE may determine the condition for triggering the synchronization signal is satisfied in subframe n which is configured as synchronization resources, and send the D2DSS and the PSBCH in subframe n.

1. The ICUE may send a mutual discovery signal within a discovery resource pool. In an example, the start point of the discovery resource pool is no earlier than subframe n+Δ (including that the start point of the discovery resource pool is the subframe n+Δ), and is within a distance of 40+Δ subframes from subframe n. The Δ is the distance between two synchronization resources configured for OCUEs. In another example, the start point of the discovery resource pool is no earlier than subframe n (including that the start point of the discovery resource pool is the subframe n), and is within a distance of 40≠M subframes from subframe n. M is an integer larger than 1. The value of M may be configured by the cell or defined in a standard. In yet another example, the start point of the discovery resource pool is no earlier than subframe n (including that the start point of the discovery resource pool is the subframe n), and is within a distance of 40 subframes from subframe n.

2. The RSRP measured by the ICUE is smaller than the RSRP threshold configured by the cell.

3. The ICUE may not transmit a wide area network (WAN) uplink signal in subframe n.

The above first condition is for providing an OCUE which receives the synchronization signal and the PSBCH of the ICUE with an opportunity to forward the synchronization signal and the PSBCH in order to extend the synchronization range. In addition, the above first condition includes two situations, and the first condition may be determined to be satisfied as long as either situation is satisfied. The n is the serial number of the subframe which is configured to be synchronization resources.

In an example, D2D synchronization resources configurations corresponding to subframe n may be applicable to Rel-12 broadcast communication UEs, Rel-12 mutual discovery UEs and UEs performing mutual discovery under PC scenarios.

The ID of the D2DSS sent by the ICUE may be the D2DSS ID configured by the cell.

The PD2DSS sequence and the SD2DSS sequence sent by the ICUE may be generated using a method defined in Rel-12.

The method of scrambling the PSBCH data may be the same with that described in example one. The method of determining PSBCH demodulation reference signal may reuse the method of determining PUSCH demodulation reference signal in LTE systems. Parameters may be set in such a manner that the demodulation reference signal in the PSBCH sent by the ICUE is orthogonal to the demodulation reference signal in PSBCH sent by a Rel-12 broadcast communication UE. According to an example, the PSBCH sent by the ICUE may be configured with a different $\Delta_{ss}$ to attain the orthogonality. For example, the value may be set as a value within [1, 29] through configuration of the cell or definition in a standard. According to another example, the PSBCH sent by the ICUE may be configured with a different CS to achieve the orthogonality. For example, the CS may be set through configuration of the cell or definition in a standard. The CS value may be different from the CS of PSBCH sent by a Rel-12 broadcast communication UE in the cell. According to yet another example, the ICUE may adopt an OCC different from an OCC of a PSBCH sent by a Rel-12 broadcast communication UE in the cell to attain the above orthogonality. For example, the value of the OCC may be mod(a+1,2), and a denotes the bit 0 of D2DSS ID. The orthogonality may be achieved using any or any combination of the above methods.

The method in this example may be combined with the method of example one, i.e., the D2DSS ID, the PD2DSS sequence and the SD2DSS sequence may be determined according to the method of example one, and parameters in determining the PSBCH demodulation reference signal may be modified according to the method of this example. The DMRS in PSBCH sent according to this method may be orthogonal to that of the method of example one. The method may be applicable to transmission of synchronization signals and PSBCH under some scenarios, e.g., transmission of the synchronization signal and the PSBCH by the OCUE2 in FIG. 3, such that the OCUE 1 can avoid interference from the PSBCH sent by the ICUE and the OCUE2.

Hence, the process of this example is completed. According to the method of this example, the D2DSS sent by a Rel-12 D2D UE is identical to that sent by an ICUE performing mutual discovery under PC scenarios, and this can reduce the complexity of D2DSS detection of an OCUE. In addition, since the DMRS in PSBCH sent by a Rel-12 broadcast communication UE is orthogonal to that sent by an ICUE performing mutual discovery under PC scenarios, thus influence on measurement of a Rel-12 D2D UE can be avoided.

Example Three

This example is under a PC scenario, i.e., UEs performing D2D mutual discovery may include ICUEs and OCUEs. An ICUE may send a D2DSS and PSBCH when a D2DSS transmission condition is satisfied. The resources occupied by the D2DSS and the PSBCH may be different from the resources occupied by D2DSS and PSBCH sent by a Rel-12 broadcast communication UE. The value range of D2DSS ID may be different from that of a Rel-12 D2D UE to avoid false detection at a Rel-12 OCUE. FIG. 6 is a flowchart illustrating a method of synchronizing D2D terminals in time and frequency in accordance with an example of the present disclosure. As shown in FIG. 6, the process may be as follows.

At step 410, an ICUE may obtain information such as synchronization resources configuration, configurations of a trigger condition for sending a synchronization signal, D2DSS configurations, PSBCH configurations, configurations of D2D mutual discovery resources, or the like from a cell.

The synchronization resources may be one of two synchronization resources pre-defined for OCUEs in Rel-12, and may be different from synchronization resources configured for Rel-12 D2D UEs by the cell.

The synchronization resources configurations may include a subframe location and a period of D2DSS transmission. The configurations of the trigger condition for sending a synchronization signal may include at least an RSRP threshold. When the RSRP measured by an ICUE is smaller than the RSRP threshold and a condition configured for the cell or defined in a standard is satisfied, the ICUE may send a D2DSS and PSBCH on the synchronization resources. The D2DSS configurations may include at least information of the ID of the D2DSS. In an example, the ID information may be configured via a signaling that is used for configuring the same information in Rel-12. The IDs of D2DSSs sent by Rel-12 UEs and UEs performing mutual discovery in PC scenarios may be obtained from the information directly or indirectly. In another example, the ID information may be configured via a newly defined signaling. The IDs of D2DSS sent by UEs performing mutual discovery in PC scenarios may be obtained from the ID information directly. The PSBCH configurations may include at least the value of reserved bits in the PSBCH. The configurations of D2D mutual discovery resources may specify the offset of the resource pool for D2D mutual discovery under PC scenarios against the zeroth system frame, a period and a subframe location of the resource pool in each period.

At step 420, when the condition for triggering a synchronization signal is satisfied, the ICUE may send a D2DSS and PSBCH on corresponding synchronization resources.

If the ICUE satisfies the following three conditions, the ICUE may determine the condition for triggering the synchronization signal is satisfied in subframe n which is configured as synchronization resources, and send the D2DSS and the PSBCH in subframe n.

1. The ICUE may send a mutual discovery signal within a discovery resource pool. In an example, the start point of the discovery resource pool is no earlier than subframe n+Δ (including that the start point of the discovery resource pool is the subframe n+Δ), and is within a distance of 40+Δ subframes from subframe n. The Δ is the distance between two synchronization resources configured for OCUEs. In another example, the start point of the discovery resource pool is no earlier than subframe n (including that the start point of the discovery resource pool is the subframe n), and is within a distance of 40≠M subframes from subframe n. M is an integer larger than 1. The value of M may be configured by the cell or defined in a standard. In yet another example, the start point of the discovery resource pool is no earlier than subframe n (including that the start point of the discovery resource pool is the subframe n), and is within a distance of 40 subframes from subframe n.

2. The RSRP measured by the ICUE is smaller than the RSRP threshold configured by the cell.

3. The ICUE may not transmit a wide area network (WAN) uplink signal in subframe n.

The above first condition is for providing an OCUE which receives the synchronization signal and the PSBCH of the ICUE with an opportunity to forward the synchronization signal and the PSBCH in order to extend the synchronization range. In addition, the above first condition includes two situations, and the first condition may be determined to be satisfied as long as either situation is satisfied. The n is the serial number of the subframe which is configured to be synchronization resources.

In this example, D2D synchronization resources configurations of subframe n may be applicable only to UEs performing mutual discovery under PC scenarios. The synchronization resources may be one of two synchronization resources pre-defined for OCUEs in Rel-12, and may be different from synchronization resources configured for Rel-12 D2D UEs by the cell.

The value range of the ID of the D2DSS sent by the ICUE may have a size smaller than 168, and may be denoted as [x, y]. In an example, $336 \leq x$, and $y \leq 503$. If the D2DSS ID information is configured by re-using Rel-12 signaling at step 210, the ID of the D2DSS sent by the ICUE may be obtained by adding an offset to the ID value configured in the signaling. The offset may be configured by the cell or defined in a standard. In an example, the offset may be 336. If the D2DSS ID of a UE performing D2D mutual discovery under PC scenarios is configured via newly defined signaling at step 210, the ID of the D2DSS sent by the ICUE may be the D2DSS ID configured via the signaling.

The PD2DSS sent by the ICUE may have a sequence length of 62. The root index of the sequence may be a value other than 26, 37, 25, 29 and 24. In an example, the PD2DSS may adopt a ZC sequence whose root index is 22 to provide good cross correlation with primary synchronization signals whose root indices are 26, 37, 25, 29 and 34.

The SD2DSS sent by the ICUE may have a sequence length of 62, and may adopt a secondary synchronization signal (SSS) sequence defined in Rel-8 for a cell ID being the D2DSS ID.

The method of scrambling PSBCH data and the method of generating DMRS in PSBCH may be identical to those in example one.

Hence, the process of this example is completed. According to the method of this example, D2DSS and PSBCH sent by a Rel-12 D2D UE and those sent by an ICUE performing mutual discovery under PC scenarios may be mapped onto different physical resources to avoid interference between the signals of the two versions of D2D UEs. In addition, the synchronization resources pre-defined for OCUE in Rel-12 are reused, thus the number of synchronization resources to be supported by the OCUE is reduced, which can reduce the complexity of D2D UEs.

Example Four

This example is under a PC scenario, i.e., UEs performing D2D mutual discovery may include ICUEs and OCUEs. An ICUE may send a D2DSS and PSBCH when a D2DSS transmission condition is satisfied. Resources occupied by the D2DSS and the PSBCH are the same resources occupied by D2DSS and PSBCH sent by a Rel-12 broadcast communication UE. The D2DSS sent by the ICUE is identical to the D2DSS sent by a Rel-12 D2D terminal. The PSBCH sent by the ICUE is identical to the PSBCH sent by the Rel-12 broadcast communication UE. FIG. 7 is a flowchart illustrating a method of synchronizing D2D terminals in time and frequency in accordance with an example of the present disclosure. As shown in FIG. 7, the process may be as follows.

At step 510, an ICUE may obtain information such as synchronization resources configuration, configurations of a trigger condition for sending a synchronization signal, D2DSS configurations, PSBCH configurations, configurations of D2D mutual discovery resources, or the like from a cell.

The synchronization resources configurations may include a subframe location and a period of D2DSS transmission. The configurations of the trigger condition for sending a synchronization signal may include at least an RSRP threshold. When the RSRP measured by an ICUE is smaller than the RSRP threshold and a condition configured for the cell or defined in a standard is satisfied, the ICUE may send a D2DSS and PSBCH on the synchronization resources. The D2DSS configurations may include at least the information of a D2DSS ID. In an example, the IDs of D2DSSs sent by a Rel-12 UE and a UE performing mutual discovery under PC scenarios may be obtained from the D2DSS configurations. The PSBCH configurations may include at least the value of reserved bits in the PSBCH. The configurations of D2D mutual discovery resources may specify the offset of the resource pool for D2D mutual discovery under PC scenarios with respect to the zeroth system frame, a period and a subframe location of the resource pool in each period.

At step 520, when the condition for triggering a synchronization signal is satisfied, the ICUE may send a D2DSS and PSBCH on corresponding synchronization resources.

If the ICUE satisfies the following three conditions, the ICUE may determine the condition for triggering the synchronization signal is satisfied in subframe n which is configured as synchronization resources, and send the D2DSS and the PSBCH in subframe n.

1. The ICUE may send a mutual discovery signal within a discovery resource pool. In an example, the subframe n is before the start point of the discovery resource pool (including that the start point of the discovery resource pool is the subframe n), and is within a distance of 40 subframes from the start point of the discovery resource pool. In another example, the subframe n is after the start point of the discovery resource pool (including that the start point of the discovery resource pool is the subframe n), and is within a distance of N subframes from the start point of the discovery resource pool. In yet another example, the subframe n may be before the start point of the discovery resource pool (including that the start point of the discovery resource pool is the subframe n), and is within a distance of N subframes from the start point of the discovery resource pool. In the above examples, the value of N may be configured by the cell or defined by a standard. For example, N may be the length of the discovery resource pool. Or, the value of N may be an integer multiple of the synchronization period. Or, the value of N may be an integer multiple of the SA resource pool configured by the cell. Or, the value of N may be statically defined to be 320.

2. The RSRP measured by the ICUE is smaller than the RSRP threshold configured by the cell.

3. The ICUE may not transmit a wide area network (WAN) uplink signal in subframe n.

The above first condition is for providing an ICUE with sufficient time for sending the synchronization signal and the PSBCH in order to avoid affecting measurements performed by a Rel-12 D2D UE. In addition, the above first condition includes three situations, and the first condition may be determined to be satisfied as long as one of the situations is satisfied. The n is the serial number of the subframe which is configured to be synchronization resources.

In an example, D2D synchronization resources configurations corresponding to subframe n may be applicable to Rel-12 broadcast communication UEs, Rel-12 mutual discovery UEs and UEs performing mutual discovery under PC scenarios.

The ID of the D2DSS sent by the ICUE may be the D2DSS ID configured by the cell.

The PD2DSS sequence and the SD2DSS sequence sent by the ICUE may be generated using a method defined in Rel-12.

In an example, the method of generating the PSBCH sent by the ICUE may adopt the method defined in Rel-12.

Hence, the process of this example is completed. According to the method of this example, the D2DSS and the PSBCH sent by an ICUE performing mutual discovery under PC scenarios are identical to those sent by a Rel-12 broadcast communication UE, and may be sent on each synchronization resource both before a discovery period and during a discovery period. The time interval between D2DSS and PSBCH transmissions is the same with that of a Rel-12 broadcast communication UE to avoid affecting measurements of a Rel-12 OCUE.

The above are several examples of synchronizing D2D terminals in time and frequency. Various examples also provide an apparatus of synchronizing D2D terminals in time and frequency which is capable of implementing the above methods. FIG. 3 is a schematic diagram illustrating the basic structure of the apparatus. As shown in FIG. 3, the apparatus may include: a configuration obtaining unit and a synchronization signal sending unit.

The configuration obtaining unit may obtain synchronization resources configurations of a current carrier, configurations of a condition for triggering a synchronization signal, D2DSS configurations, PSBCH configurations, and configurations of D2D mutual discovery resources. The synchronization signal sending unit may send a D2DSS and a PSBCH on synchronization resources determined by the synchronization resources configurations and the configurations of D2D mutual discovery resources according to the D2DSS configurations and the PSBCH configurations in response to a determination that the condition for triggering the synchronization signal is satisfied.

Those skilled in the art can understand that some or all of the steps of the methods provided by the embodiments may be implemented by hardware controlled by software. The software may be stored in a computer-readable storage medium. The software may implement any or any combination of the procedures of the methods when executed.

The modules of various examples may be integrated into one processing module, or may be standalone physical units (for example, a processor, a controller etc). Or, two or multiple of the above modules may be integrated into one module. The integrated module may be implemented by hardware or software modules. The integrated module may also be stored in a computer-readable storage medium when implemented by software modules and sold and used as an individual product.

The storage medium may be read-only storage medium, magnetic disks or compact disks, or the like.

The foregoing are only preferred examples of the present disclosure and are not for use in limiting the protection scope thereof. All modifications, equivalent replacements or improvements in accordance with the spirit and principles of the present disclosure shall be included in the protection scope of the present disclosure.

The invention claimed is:

1. A method for transmitting a synchronization signal by a user equipment (UE) in a coverage of a base station, comprising:
receiving, from the base station, configuration information including a threshold value and information on a synchronization resource;
measuring a reference signal received power (RSRP) of a signal from the base station;
transmitting, in a subframe indicated by the information on the synchronization resource, a device-to-device synchronization signal (D2DSS) in case that the RSRP of the signal is less than the threshold value and the UE is configured to perform a non-public safety (non-PS) related D2D discovery operation; and
transmitting, in the subframe indicated by the information on the synchronization resource, the D2DSS and a physical sidelink broadcast channel (PSBCH), in case that the RSRP of the signal is less than the threshold value and the UE is configured to perform a public safety (PS) related D2D discovery operation,
wherein the D2DSS includes a primary D2DSS and a secondary D2DSS,
wherein a sequence for the primary D2DSS is generated from a Zadoff-Chu sequence and a sequence for the secondary D2DSS is generated from an m-sequence having a length of 62, and
wherein the PSBCH includes information on a time division duplex (TDD) configuration and information on a bandwidth configuration for a D2D transmission.

2. The method of claim 1, wherein the configuration information further comprises D2DSS ID information, and
wherein a D2DSS ID of the D2DSS is obtained based on the D2DSS ID information.

3. The method of claim 1, wherein the subframe is a start point of a discovery resource pool, and
wherein the subframe is not configured for uplink signal transmission.

4. The method of claim 1, wherein the configuration information includes a period of D2DSS transmission.

5. The method of claim 1, wherein the subframe precedes a start point of a discovery resource pool and is within a predetermined distance from the start point of the discovery resource pool, and
wherein the subframe is not configured for uplink signal transmission.

6. The method of claim 1, wherein the PSBCH further includes information on a system frame number.

7. A user equipment (UE) for transmitting a synchronization signal in a coverage of a base station, comprising:
a transceiver; and
a controller coupled with the transceiver and configured to control to:
receive, from the base station, configuration information including a threshold value and information on a synchronization resource;
measure a reference signal received power (RSRP) of a signal from the base station;
transmit, in a subframe indicated by the information on the synchronization resource, a device-to-device synchronization signal (D2DSS) in case that the RSRP of the signal is less than the threshold value and the UE is configured to perform a non-public safety (non-PS) related D2D discovery operation; and transmit, in the subframe indicated by the information on the synchronization resource, the D2DSS and a physical sidelink broadcast channel (PSBCH), in case that the RSRP of the signal is less than the threshold value and the UE is configured to perform a public safety (PS) related D2D discovery operation, wherein the D2DSS includes a primary D2DSS and a secondary D2DSS, wherein a sequence for the primary D2DSS is generated from a Zadoff-Chu sequence and a sequence for the secondary D2DSS is generated from an m-sequence having a length of 62, and wherein the PSBCH includes information on a time division duplex (TDD) configuration and information on a bandwidth configuration for a D2D transmission.

8. The UE of claim 7, wherein the configuration information further comprises D2DSS ID information, and wherein the controller is further configured to obtain a D2DSS ID of the D2DSS based on the D2DSS ID information.

9. The UE of claim 7, wherein the subframe is a start point of a discovery resource pool, and wherein the subframe is not configured for uplink signal transmission.

10. The UE of claim 7, wherein the configuration information includes a period of D2DSS transmission.

11. The UE of claim 7, wherein the subframe precedes a start point of a discovery resource pool and is within a predetermined distance from the start point of the discovery resource pool, and wherein the subframe is not configured for uplink signal transmission.

12. The UE of claim 7, wherein the PSBCH further includes information on a system frame number.

* * * * *